(12) United States Patent
Whiteley

(10) Patent No.: US 6,318,021 B1
(45) Date of Patent: Nov. 20, 2001

(54) BIOMASS CONDITIONING

(75) Inventor: Geoffrey Michael Whiteley, Ilkley (GB)

(73) Assignee: The University of Leeds Innovations Ltd., West Yorkshire (GB)

( * ) Notice: Subject to any disclaimer, the term of this patent is extended or adjusted under 35 U.S.C. 154(b) by 0 days.

(21) Appl. No.: 09/308,023

(22) PCT Filed: Nov. 13, 1997

(86) PCT No.: PCT/GB97/03030

§ 371 Date: Jul. 6, 1999

§ 102(e) Date: Jul. 6, 1999

(87) PCT Pub. No.: WO98/21292

PCT Pub. Date: May 22, 1998

(30) Foreign Application Priority Data

Nov. 13, 1996 (GB) .................................................. 9623578

(51) Int. Cl.[7] .................................................. C09K 17/02
(52) U.S. Cl. .................................................. 47/9; 47/58.1
(58) Field of Search ............................. 47/9, 58.1; 71/24

(56) References Cited

U.S. PATENT DOCUMENTS

| | | | |
|---|---|---|---|
| 4,780,326 | * | 10/1988 | Stemmler et al. .................... 426/125 |
| 5,034,056 | * | 7/1991 | von Bonin ........................ 106/18.12 |
| 5,213,692 | * | 5/1993 | Hjersted .............................. 71/24 X |
| 5,354,350 | * | 10/1994 | Moore ..................................... 71/24 |
| 5,411,569 | * | 5/1995 | Hjersted ................................. 71/24 |
| 5,456,553 | * | 10/1995 | Ii et al. ................................ 405/263 |
| 5,603,744 | * | 2/1997 | Kurner ............................... 71/24 X |
| 5,632,799 | * | 5/1997 | Behel, Jr. et al. ..................... 71/63 |
| 5,658,097 | * | 8/1997 | Komori et al. ...................... 405/263 |
| 5,672,434 | * | 9/1997 | Dalebroux et al. .................... 47/9 X |
| 6,080,220 | * | 6/2000 | Sequi et al. ............................ 71/11 |

FOREIGN PATENT DOCUMENTS

| | | | |
|---|---|---|---|
| 4444032C | | 5/1996 | (DE) . |
| 29919224 U1 | * | 3/2000 | (DE) . |
| 84402008.1 | | 10/1984 | (EP) . |
| 0616978A | | 9/1994 | (EP) . |
| 56124321 A | * | 9/1981 | (JP) . |
| 482298-A | * | 12/1975 | (SU) . |
| 835748-B | * | 6/1981 | (SU) . |

OTHER PUBLICATIONS

Database, WPI, Section CH, Week 8723, Derwent Publications Ltd., London, GB & JP 62 096 385 A (Loren Sangyo KK), May 2 1987.

Database, WPI, Section CH Week 8715, Derwent Publication, Ltd., London, GB & SU 1 250 570 A (Pakshiwa SM), Aug. 15, 1986.

"Effect of Iron on Biological activity of Activated Sludge with Simultaneous Precipitation of Phosphorus", Chemical Abstract, vol. 122, No. 18, May 1 1995.

* cited by examiner

*Primary Examiner*—Peter M. Poon
*Assistant Examiner*—Jeffrey L. Gellner
(74) *Attorney, Agent, or Firm*—Beyer Weaver & Thomas, LLP

(57) ABSTRACT

A method of treating plant biomass material involves treating the material with sesquioxide mineral forming constituents to form protective coatings on surfaces of the material and to alter the bulk physical and chemical properties of the treated material. The material is treated with an aqueous solution of soluble iron and/or aluminum thus improving microbial stability and quality of the materials.

10 Claims, No Drawings

BIOMASS CONDITIONING

BACKGROUND

This invention relates to a method of treating biomass material such as plant biomass material, and particularly, but not exclusively, to a method of treating such materials with sufficiently large additions of the sesquioxide mineral forming constituents iron and aluminium to form protective coatings on surfaces of the material and to alter the bulk physical and chemical properties of the treated material.

The invention relates particularly to a method of treating plant material in order to protect the material from microbial decomposition.

It is known to use the reduced form of iron, $Fe^{2+}$, and associated salts, in particular iron II sulphate for a number of purposes in agriculture and horticulture, including fertilisers, trace element additives, and slug and moss killers. In a particular use, Iron II sulphate has been used as an additive during the ageing and composting of wood bark, where it is used as an acidity moderator in the same way as other acidity regulating agents such as mineral sulphur.

Application of iron salts has also been used to condition mulches in order to reduce water retention.

The organic complexing properties of iron and aluminium ions in solution have been in common use in water purification treatments and the like to complex, precipitate and sediment coloured and odour producing organic species. Iron and aluminium, together with other more toxic metals such as copper, arsenic and the like are common ingredients of some types of wood preservatives used to protect wood cellulose fibres from fungal attack.

One such known application involves binding these metal ions to detergent chains.

Other wood preservative treatments use powerful iron complexing substances to ensure that fungal growth will be limited due to a shortage of available iron substances.

In a number of other known mulching and compost forming processes other means have been used for conferring protection from microbial decomposition, including resin coatings, colloidal lignite, clay minerals.

Iron III chloride has been used in the field treatment of crop residues. However, such use has proved unsatisfactory for the treatment of mulches and grain media because chloride is phytotoxic to many plant species. In addition, application of oxidised iron has been found to be ineffective at penetrating and reacting with chemical sites and internal surfaces in the treated material due to rapid precipitation.

SUMMARY OF THE INVENTION

Using a reduced iron II salt creates a period of oxygen depletion as dissolved oxygen is consumed by the iron oxidation reaction. This period of oxygen depletion is important, not only for creating a local microenvironment in which iron remains much more soluble for reaction, but also acting as a partial sterilant by depriving aerobic organisms of oxygen.

According to a first aspect of the present invention there is provided a method of treating biomass material to form precipitates of Fe and/or Al oxides and/or hydroxides as a protective coating on the surface of the material.

According to a second aspect of the present invention there is provided a biomass material having been treated by a method according to the first aspect of the present invention.

In natural soils, the persistence of many organic matter constituents (e.g. soil polysaccharide polymer gels and cell wall cellulose structures) is often much longer than for the same materials in laboratory culture. This is attributed to a whole series of physical and chemical protection mechanisms. Physical protection renders material inaccessible to fungal hyphae, bacterial cells and polymer degrading external enzymes that de-polymerise and solubilise the material to release smaller water soluble fractions which can be metabolised. Chemical protection refers to the alteration of polymer surfaces and enzyme cleavage points by complexed and adsorbed substances which inhibit the action of degrading enzymes. Humic substances formed during decomposition in soils and composts and colloidal clay minerals contribute to this physical and chemical protection. However the organic matter in soils is also strongly associated with hydrated and gelatinous hydroxides of iron and aluminium which are also known to be very important contributors to physical and chemical protection. These sesquioxides form naturally through a slow process in all types of soil environments, where release of Fe and Al from mineral weathering, dissolution with pH and changes in the oxidation and reduction state occur.

The present invention provides a process for bringing about the rapid formation of these sesquioxides by treating biomass materials with available and mobile forms of iron and aluminium in aqueous solution.

Most plant materials tend to have a small iron content which results from nutrient uptake during growth. If such plant material content is not intimately mixed into a mineral soil it will not be exposed to conditions where iron complexing will take place.

By means of the present invention iron is added in a mobile and soluble form of $Fe^{2+}$ which rapidly promotes the physical and chemical protection mechanisms described above.

Preferably, the method comprises treating plant biomass materials with an addition of effective amount of iron or aluminium sesquioxide forming constituents.

Preferably the sesquioxide comprises a hydrated or gelatinated hydroxide of iron or aluminium.

The invention is particularly appropriate for use with straw from crop plants, chopped wood and bark or compost.

Advantageously, the biomass materials are treated with an aqueous solution of iron ions at a concentration of between 0.1 g and 4.0 g of retained iron per litre of biomass material.

Conveniently the biomass materials are treated with a total of up to 4.0 g of iron or aluminium per litre of biomass.

When applied in a suitable volume of water, this application rate of soluble iron is sufficient to enable distribution, penetration and complexing with substrate chemical binding sites in a biomass material, followed by oxidation of any residual $Fe^{2+}$ species into precipitated $Fe^{3+}$ oxides or hydroxides. The resultant precipitated coating produced by this process is clearly visible on the surface of biomass materials within a period of one to four hours after treatment.

Plant biomass residue contains variable contents of polyphenolic tannins. Tannins can be more resistant to microbial decomposition than other constituents of the biomass. Tannins are known to bind strongly to proteins and so their ability to bind and inactivate degradative enzymes can confer resistance to breakdown by saprophytic microorganisms. Under moist or water soaking conditions, tannins become mobilised and can leach out of the material. For example, hot water extraction is the most common method for extracting vegetable tannins for other industrial uses such as leather tanning. It is also very widely known that vegetable tannins form strong specific binding complexes with iron, producing dark brown pigmented complexes, and with aluminum ions and that these complexes will precipitate water soluble tannins.

By means of the present invention, by allowing a period of wet or moist soaking in the presence of soluble iron (plus aluminium if added) initial mobilisation of tannins is allowed to take place, following which they come into contact with the iron ions forming the dark brown pigmented precipitates in the biomass material.

By means of the present invention a treatment process is provided whereby the microbial stability and quality of biomass materials is improved for use in substrates for growing plants, horticultural and field mulches, as a peat substitute constituent in composts, as a spray treatment for field crop residues, as a composting additive, as a treatment for other uses for plant biomass in bedding materials and the like, and as a crop residue treatment to bring about a long term increase in the organic matter content of cultivated soils.

Preferably, the biomass material is treated with an aqueous solution of iron prepared by dissolving iron II sulphate in water and applying to the biomass material.

Alternatively, the aqueous solution of iron is made up from an alternative soluble material such as iron II chloride, iron III chloride or any other suitable salts.

This enables a water soluble solution of iron ions to be prepared for application to the biomass.

The simple addition of ferrous salts to biomass material makes use of the chemical instability of aqueous $Fe^{2+}$ ions in the presence of oxygen resulting in oxidation to, and precipitation of, the very much less soluble FeIII species.

Advantageously, all or a portion of the soluble iron species in the solution are replaced by one or more aqueous ionic species of aluminium salts.

Preferably, the method further comprises addition of sodium and/potassium silicate. This raises the pH of the treated material, and lowers the concentration of the iron or aluminium ions. It may further stabilise precipitated oxides and hydroxides of iron and aluminium by forming surface complexes.

The sodium and/or potassium silicate may be added either before or after application of the iron or aluminium irons.

The method may further comprise the step of addition of a liming agent.

This has the effect of raising the pH of the treated material.

The liming agent may be selected from $CaCO_3$, $Ca(OH)_2$, alkalihydroxides, ammonia, ground chalk or limestone.

The use of liming agents not only raises the pH but also counteracts the acidifying reaction of iron and aluminium hydroxide.

Preferably, the method further comprises the addition of silicate. This exploits the pH raising properties of silicate and a strong binding reaction between iron and aluminium ions and silicate leading to the formation of iron and aluminium silicate precipitates. Silicate has additional advantages over a conventional liming agent because silicate binding reduces the potential for phosphate binding with aluminium and iron is when phosphate fertiliser is later applied.

Hydrogen peroxide may also be added to the biomass as an oxidising agent.

The biomass material to be treated will comprise an initial content of humic acids, polysaccharides, polyphenolic substances, lignin complexes and tannins, which act as sites for iron and aluminium adsorption and complexing.

Preferably, the above mentioned compounds are supplemented by exogenous sources to promote adsorption and precipitation and to promote colour development through the formation of organic iron complexes.

Conveniently, the method further comprises the step of adding tannin extracts.

This allows the treatment process to be applied to materials with a lower or unreactive indigenous tannin content, for example, shredded wood fibres of sawdust, by adding vegetable tannins from other sources. By extending the duration of storage in a moist condition, it is possible to supplement darkening by creating the conditions in which saprophytic fungi and bacteria will synthesise additional polyphenolic substances which then become available to react with iron.

The treatment may be applied to the biomass material in situ. In other words, the method according to the present invention may be applied to material in, for example, a field before ploughing the field to ensure penetration of the treatment into the soil.

Material treated by means of a method according to the present invention may be used a soil conditioner for mixing to soil, or as the whole or partial constituent of materials for surface mulching layers above the ground. In addition, treated material may be used as a substrate or constituent of the substrate prepared as plant grain medium.

Conveniently, the method further comprises adding plant nutrients to the treated material to modify the nutritional properties of the material.

Preferably, after treatment, the material is left for a period of time to allow for composting or aging before the end use.

Advantageously, the method further comprises a sterilisation treatment of the biomass material.

Preferably, the method further comprises the step of rinsing or leaching the biomass material after treatment in order to lower the conductivity of the material through removal of soluble ionic species.

A material which has been treated through the method of the present invention may be used as a filtration medium for cleaning water.

The proportions of iron and aluminium for promoting acidification in conjunction with added silicates and liming agents are preferably balanced in order to achieve a buffered pH substantially within the range of 4 to 7.5.

Treatment of materials according to the method of the present invention results in a protective coating being formed on the surfaces of the biomass materials which alters the bulk physical and chemical properties of the treated material.

The invention thus provides a novel process in which synthetic soil sesquioxides are absorbed and precipitated onto the surface of biomass material as a conditioning and preservative treatment.

The method of the present invention has the advantage of using simple inexpensive inorganic chemicals to produce a coating on biomass materials which coating maintains close intimate contact through chemical complexing and produces sesquioxide organic matter complexes which are similar to those found naturally in soils.

The precipitated coating resulting from treating a material according to the method of the present invention has similar properties to naturally occurring sesquioxides in soils, and provides principle benefits of increased physical and chemical protection from microbial decomposition and reductions in the microbial demand for oxygen, and nitrogen during decomposition. The treatment is also used to control pH, cation exchange capacity, ability to absorb heavy metal species through substitution and water retention in the end product.

Preferably, the biomass materials are treated by means of spraying and mixing. Treatment may be applied through a single spray or through mixing or both. The method may comprise multiple similar applications of treatment during composting, or a spray treatment for crop residues in the field.

In the method according to the present invention, Fe may be partially or wholly substituted with water soluble ionic aluminium species.

Naturally occurring soil sesquioxide fractions usually contain mixtures of iron and aluminium, but aluminium cannot be precipitated by the oxidation reaction used to precipitate iron and residual aluminium has a potential to cause phytotoxicity problems. When using aluminium as part of the treatment, the use of pH changing compounds, such as silicate or polysaccharides can be employed to ensure immobilisation of soluble aluminium species.

DETAILED DESCRIPTION OF EMBODIMENTS OF THE INVENTION

The metals are conveniently applied with water soluble ionic species to enable distribution, penetration and complexing with substrate chemical binding sites, followed by a rendering of any residual metal species into an available form of low solubility through oxidation, pH adjustment or addition of the specified complexing agent.

The invention will now be further described by means of example but not in any limitative sense:

EXAMPLE 1
A General Purpose Soil Covering Mulch Prepared from Wheat Straw

Fresh wheat straw at 12% w/w water content taken directly from bales was hammer milled in a single pass to give a modal straw length of 30 mm. During the single hammer mill pass an integral sprayer added water at an application rate regulated to give a treated water content of 27%.

Iron II sulphate and ammonium nitrate were mixed into the spray tank of the integral sprayer at concentrations calculated to result in the treated sample receiving 0.40 g of iron and 0.25 g of N per packed litre of treated mulch material.

After 26 h in a 1.5 m high stockpile additional water was drenched into the mixture to make the water content up to 55% w/w and the resultant material packed into closed but non air tight 100 litre black lined polythene bags. After storage outdoors for between 2 weeks and 3 months the material shows a rich brown coloration and fibre properties which remained stable in storage in a moist condition. In other words, the material had not collapsed and become slime like as shown in non Fe treated samples of wheat straw under the same conditions.

This produces a material with appearance and properties for use as a garden mulch for applying a layer from 2 to 10 cm depth on the soil surface of plant beds.

Adding a 10 cm layer to a range of newly transplanted perennial species has shown good healthy growth and the absence of chlorotic leaves and stunted growth shown when untreated straw was applied at the same rate.

The pH of the treated material after 3 weeks storage was 5.9 compared to 6.9 for the untreated straw making the material suitable for a wider range of plants.

Weed seeds are a common problem when using wheat straw. When viable wheat seeds were added to samples of chopped straw as above prior to treatment, at 10 days after treatment seed viability in germination tests was reduced from 87% to 1.9% showing the potential of the treatment to clean mulches of indigenous weed seed populations. A temporary oxygen starvation during water soaking, an initial drop in pH to 3.7 at day 2 and temporary phytotoxicity of iron in the soaking solution plus any reaction products of this Fe are all thought to be contributing to this suppression. A widely used standard measure of the microbial stability of mulches and growing media is the nitrogen draw down index (NDI) which measures the microbial demand for nitrogen under standard incubation conditions. Three week old samples of the material as treated above were found to have an NDI value of 0.74 which was more similar to a 12 month old matured and composted pine bark of 0.85 than a moistened but untreated wheat straw of 0.31. The partial sterilisation effect of the pH change and oxygen shortage and the more difficult conditions for microbial population development are thought to be contributing to this marked increase in stability.

EXAMPLE 2
Preparation of a Fine Soil Conditioner/Growing Media Constituent from Wheat Straw Fresh wheat straw at 12% w/w water content taken directly from bales was hammer milled without adding any spray and a fine fraction of the milled material was collected by screening with a modal fibre length of between 2 and 5 mm. The fine fraction was transferred to a mixing drum and water added from a coarse spray jet to bring the material to 55% w/w water content. Iron II sulphate was mixed into the spray at a concentration calculated to result in the treated sample receiving 1.0 g of Fe per packed litre of treated mulch material. After 20 h in a 0.70 high stockpile, 20:10:10 N,P,K fertilizer preparation at 3.0 g per packed litre and 1.0 g per packed litre of ground chalk were added in dry powder form. This was mixed in by turning the pile and the resultant material packed into closed but non air tight 100 litre black lined polythene bags. After storage outdoors for between 2 weeks and 3 months the material showed a rich brown coloration and fibre properties which remained stable in storage in a moist condition i.e. the material had not collapsed and become slime like as shown in non Fe treated samples of wheat straw under the same conditions. This produces a material with appearance and properties for use as a garden soil conditioner for mixing into topsoil to improve structure workability and add organic matter. Adding 10 litres of this material per square meter and mixing into the top 7 cm of a planted produced a stable aggregated surface layer which retained its appearance and workability through a 12 week summer period without visible detriment to the surrounding plants. During this period no wheat seedlings were found across a 5 square meter treated plot area. The pH of the treated material after 3 weeks storage was 6.4 for the untreated straw making the material suitable for most non-acid loving plants.

EXAMPLE 3
Preparation of a Fine Soil Conditioner for Use Around Acid Flavouring Plants The process was prepared as described for process 2, except that the 1.0 g per litre of ground chalk was not added but replaces by an application of sodium silicate solution to give the calculated equivalent of 0.25 g of Si per litre of packed soil conditioner. This produced a material with a pH of 5.2 and having no added calcium, making it suitable for incorporation prior to planting or around established acid loving plant sand shrubs. When this material was used as a growing medium base for tomato plants, it was found that without the Si application, stunted growth of tomatoes took place which was thought to be specifically linked to phosphate shortage. This was believed to be due to reaction of P added in subsequent fertilisers with the surfaces of iron oxide precipitates. Adding sufficient silicate in advance is thought to react with these sites and so reduce sites for P adsorption.

What is claimed is:

1. A method of preventing microbial decomposition in biomass material including the step of treating the biomass with an aqueous solution containing iron II and/or aluminum ions including ferrous ions at a concentration of substantially between 0.1 and 4.0 g of retained iron per liter of biomass material.

2. A method as claimed in claim 1, wherein the biomass is treated by spraying.

3. A method as claimed in claim 1 wherein the material is treated with an effective amount of iron or aluminum sesquioxide mineral forming compounds.

4. A method according to claim 3, wherein the sesquioxide comprises a hydrated or gelatinated hydroxide of iron or aluminum.

5. A method according to claim 1, wherein the biomass material is treated with between 0.1 and 4.0 g/l of a mixture of iron II and aluminum.

6. A method according to claim 1 further comprising the step of soaking the material in an aqueous solution of iron II and/or aluminum.

7. A method according to claim 1 wherein the biomass material is treated with aqueous iron II sulfate solution.

8. A method according to claim 1, further comprising the step of adding at least one alkali metal silicate.

9. A method according to claim 1, further comprising the step of adding an effective quantity of a liming agent.

10. A method according to claim 1 further comprising the step of adding a tannin extract.

* * * * *